Patented Sept. 14, 1926.

1,599,996

UNITED STATES PATENT OFFICE.

HOWARD E. FRITZ, OF COLUMBUS, OHIO, ASSIGNOR TO THE SMITH AGRICULTURAL CHEMICAL COMPANY, OF COLUMBUS, OHIO.

CLEANING COMPOUND AND PROCESS OF PREVENTING THE DELIQUESCENCE OF A SALT.

No Drawing.     Application filed November 26, 1924. Serial No. 752,468.

This invention relates to a cleaning compound for cleaning the surfaces of porcelain, and like surfaces, occurring in toilet and closet bowls and like articles, and other articles having surfaces as characterized above. The object of the invention is the production of a powder or mixture which is capable of persisting in the air or in packages upon storing without lumping or caking, and which retains a granular or pulverulent condition without agglomeration or adhesion of the particles of which the compound is composed.

In preparing my compound I make use of sodium bisulphate or nitre cake, with or without the addition of potassium chloride and such compounds as magnesium carbonate, magnesium oxide, aluminum oxide, zinc oxide, ferric oxide ($Fe_2O_3$) or cupric oxide ($CuO$), or mixtures of them.

Sodium bisulphate ($NaHSO_4$), as is well known, is a deliquescent substance absorbing considerable amount of water from the atmosphere when exposed to the latter. Although the quantity of water absorbed by sodium bisulphate is not sufficient to fully liquefy it, as in the case of this well known property of calcium chloride, sufficient moisture is absorbed to cause hardening and caking of the particles, whereby the granular or powder condition is destroyed. On account of this peculiar property, the preservation of sodium bisulphate containing preparations in a granular or free flowing condition for any length of time in any form of carton or package, suitable for economical commercial requirements, has been found practically impossible.

I have found, however, that the above described objectionable property of sodium bisulphate or of a mixture such as sodium bisulphate and potassium chloride is avoided by the addition of a small quantity of magnesium oxide, commonly known as calcined magnesite, to the sodium bisulphate or the mixture including it. I have also found that instead of magnesium oxide, I may use with beneficial results, magnesium carbonate, aluminum oxide, zinc oxide, ferric oxide, and cupric oxide, and other similar compounds capable of chemically uniting with a part of the acidic part of the sodium bisulphate to the formation of sulphates or compounds which are not deliquescent in character. The compound thus resulting from this reaction, which in the case of magnesium oxide or carbonate is magnesium sulphate, a non-deliquescent substance, surrounds the particles of deliquescent sodium bisulphate or other deliquescent substance, and effectively protects them from absorbing moisture from the atmosphere. Aluminum oxide, zinc oxide, ferric oxide, and cupric oxide act in a similar manner as magnesium oxide and carbonate, with the exception that corresponding metallic sulphates are formed. The slight amount of water necessary for promoting the reaction above described, is found in the absorbed moisture of the substances treated.

The same protective influence which is exerted upon sodium bisulphate by the compounds described above takes place in the case of other deliquescent compounds and sulphates as potassium bisulphate and ammonium bisulphate. It is obvious to those skilled in the art that the principle herein described of protecting a deliquescent body by means of a nondeliquescent coating or covering, formed on the deliquescent body or particles thereof through the reaction of the latter with added ingredients, is not limited to the particular deliquescent bodies described, nor to the reactive agents enumerated. Nor is the principle limited in application to mixture of a deliquescent body with a non-deliquescent body or bodies but may be applied to a single deliquescent body or to an admixture of several deliquescent bodies, either alone or with one or more non-deliquescent bodies. Nor is it essential that the deliquescent compound or body be included in a cleaning composition as is desirable for obvious reasons to have it protected from deliquescence either alone or in other relationships, as where deliquescent chemicals are stored or shipped, or formed into compositions other than cleaning powders. In this manner, deliquescent chemicals and bodies may be effectively preserved substantially free from deliquescence when stored, shipped, or when used in compositions and other relationships.

A preferred and efficient application of the invention is the making of a cleaning powder of about ninety eight per cent (98%) of finely powdered or granulated sodium bisulphate (nitre cake) with some two per cent (2%) of extremely finely powdered oxide of magnesium. These ingredients are intimately mixed in the form of powders or admixed by grinding them together in a suitable grinding mill. In the composition thus formed, the extremely finely powdered oxide of magnesium reacts, as indicated above, with a small portion of the free sulphuric acid contained in the sodium bisulphate or with a part of the acid character of the latter, and forms a coating or covering of magnesium sulphate surrounding the deliquescent sodium bisulphate, whereby absorption of moisture from the air is effectively prevented. The magnesium sulphate resulting from the reaction readily dissolves in the water mixed with the cleaning compound when used, and thus liberates completely the sodium bisulphate for cleansing purposes. Any magnesium oxide which has not gone into reaction before solution, readily does so upon the addition of water. The action of the finely divided magnesium carbonate, aluminum oxide, zinc oxide, ferric oxide or cupric oxide, is similar to magnesium oxide.

As the oxide of magnesium, and the other compounds described as capable of use in its stead, through the agency of chemical reaction, prevents the absorption of moisture from the atmosphere and is quickly and completely soluble in water in the presence of the other ingredients of the compound, it may be properly referred to as a reactive or active agent or element in the composition.

When potassium chloride is used with the sodium bisulphate, sufficient quantity of the chloride should be added to form, when the compound is added to water, an appreciable concentration of dissolved hydrochloric acid, which results from the reaction of the chloride and the bisulphate. The quantity of chloride to be used may clearly vary, depending upon the uses for which the compound is prepared, as will be readily understood by those skilled in the art. I have found that one (1) to two (2) per cent of potassium chloride accelerates considerably the cleansing and incrustation removing action of the compound.

The proportions of active or reactive protective materials used above, as will be readily appreciated by those skilled in the art, may vary within wide limits, sufficient however being used to obtain the results described. While I have described the use of about two (2) per cent of these active protective ingredients, my invention is not limited to these specific proportions, as they may be varied or modified to meet varying conditions.

Cleaning compositions when made in the above described manner may be preserved in paper, carton, wooden or metallic containers, in the stock or on the shelves of wholesale or retail merchants, for many months, without losing their pulverulent or granular form or capacity of being readily poured from such package when used in cleaning.

While I have used the terms alkali bisulphate and sodium bisulphate and similar terms in the claim, I do not intend thereby to limit myself in the claims to substances defined by these terms alone, but I also intend to include by these terms substances or compositions including the substances included within these terms. For example, by these terms I intend to include also the commercially known niter cake and cylinder cake or similar products containing sodium bisulphate.

I claim:—

1. A composition suitable for use as a cleaning powder comprising a deliquescent cleaning salt and an agent comprising a solid material capable of reacting with said deliquescent salt for preventing caking or agglomeration of the particles of the powder, said agent being insufficient in quantity to completely destroy said deliquescent cleaning agent.

2. A composition suitable for use as a cleaning powder comprising a deliquescent cleaning salt and a metalliferous substance capable of reacting with said deliquescent salt for preventing caking or agglomeration of the particles of the powder, said metalliferous substance being insufficient in quantity to completely destroy said deliquescent cleaning agent.

3. A composition suitable for use as a cleaning powder comprising a deliquescent cleaning salt and a metallic oxide reacting with said deliquescent salt for preventing caking or agglomeration of the particles of the powder, said metallic oxide being insufficient in quantity to completely neutralize the deliquescent cleaning salt.

4. A composition suitable for use as a cleaning powder comprising a deliquescent cleaning salt and magnesium oxide.

5. A composition suitable for use as a cleaning powder comprising a deliquescent cleaning salt and about two (2) per cent magnesium oxide.

6. A composition suitable for use as a cleaning powder comprising an alkali bisulphate and an agent capable of reacting with the bisulphate for preventing caking or agglomeration of the particles of the powder, said agent being sufficient in quantity to react with only a part of said bisulphate.

7. A composition suitable for use as a cleaning powder comprising an alkali bisulphate and a metalliferous substance capable of reacting with the bisulphate for preventing caking or agglomeration of the particles of the powder, said substance being sufficient in quantity to react with only a small part of said bisulphate.

8. A composition suitable for use as a cleaning powder comprising an alkali bisulphate and a metallic oxide capable of reacting with the bisulphate, said metallic oxide being sufficient in quantity to react with only a part of said bisulphate.

9. A composition suitable for use as a cleaning powder comprising an alkali bisulphate and magnesium oxide.

10. A composition suitable for use as a cleaning powder comprising an alkali bisulphate and about two (2) per cent magnesium oxide.

11. A composition suitable for use as a cleaning powder initially comprising sodium bisulphate and an agent capable of reacting with said sodium bisulphate for preventing caking or agglomeration of the particles of the powder, said agent being insufficient in quantity to react with all of the sodium bisulphate.

12. A composition suitable for use as a cleaning powder initially comprising sodium bisulphate and a metalliferous substance capable of reacting with said sodium bisulphate for preventing caking or agglomeration of the particles of the powder, said substance being sufficient in quantity to react with only a small part of the sodium bisulphate.

13. A composition suitable for use as a cleaning powder initially comprising sodium bisulphate and a metallic oxide capable of reacting with said sodium bisulphate for preventing caking or agglomeration of the particles of the powder, said oxide being sufficient in quantity to react with only a small part of the sodium bisulphate.

14. A composition suitable for use as a cleaning powder initially comprising sodium bisulphate and magnesium oxide.

15. A composition suitable for use as a cleaning powder initially comprising sodium bisulphate and about two (2) per cent magnesium oxide.

16. The process of preventing the deliquescence of sodium bisulphate which comprises bringing magnesium oxide into reactive chemical relationship with said bisulphate.

17. The process of preventing the deliquescence of an alkali bisulphate which comprises bringing into reactive chemical relationship with said bisulphate a reagent capable of forming therewith a water soluble non-deliquescent body, said reagent being insufficient in quantity to react with all of said bisulphate.

18. The process of preventing the deliquescence of sodium bisulphate which comprises bringing into reactive chemical relationship with said bisulphate a metallic oxide in insufficient quantity to react with all of said bisulphate.

19. The process of preventing the deliquescence of a deliquescent bisulphate which comprises bringing into reactive chemical relationship with said bisulphate a metallic oxide in a quantity insufficient to react with all of said bisulphate.

20. The process of preventing the deliquescence of a deliquescent salt or particles thereof which comprises bringing into reactive chemical relationship with said salt or particles thereof a solid reagent capable of forming therewith a water soluble non-deliquescent body, said reagent being present in sufficient quantity to react with only a part of the quantity of said deliquescent salt.

21. A deliquescent bisulphate coated with magnesium sulphate.

22. A cleaning composition comprising sodium bisulphate coated with magnesium sulphate.

In witness whereof I have hereunto set my hand.

HOWARD E. FRITZ.